United States Patent
Toni

(10) Patent No.: US 12,263,771 B2
(45) Date of Patent: Apr. 1, 2025

(54) SEAT PROVIDED WITH A MICROPHONE FOR A VEHICLE

(71) Applicant: FERRARI S.P.A., Modena (IT)

(72) Inventor: Fabio Toni, Modena (IT)

(73) Assignee: FERRARI S.P.A., Modena (IT)

(*) Notice: Subject to any disclaimer, the term of this patent is extended or adjusted under 35 U.S.C. 154(b) by 177 days.

(21) Appl. No.: 18/194,920

(22) Filed: Apr. 3, 2023

(65) Prior Publication Data

US 2023/0322139 A1   Oct. 12, 2023

(30) Foreign Application Priority Data

Apr. 6, 2022  (IT) .................. 102022000006809

(51) Int. Cl.
  *B60N 2/879*   (2018.01)
  *B60R 11/02*   (2006.01)

(52) U.S. Cl.
  CPC .......... *B60N 2/879* (2018.02); *B60R 11/0247* (2013.01)

(58) Field of Classification Search
  CPC ........................... B60N 2/879; B60R 11/0247
  USPC ........................................... 297/217.3, 217.4
  See application file for complete search history.

(56) References Cited

U.S. PATENT DOCUMENTS

| | | | | |
|---|---|---|---|---|
| 6,094,496 A | * | 7/2000 | Stowers, Sr. | .......... H04R 5/023 |
| | | | | 381/361 |
| 6,215,518 B1 | * | 4/2001 | Watkins | ................. B60N 2/806 |
| | | | | 386/358 |

FOREIGN PATENT DOCUMENTS

| | | | | |
|---|---|---|---|---|
| CN | 112712786 A | * | 4/2021 | ............. B60N 2/879 |
| DE | 102018125515 A1 | | 4/2020 | |
| DE | 202021105680 U1 | * | 12/2021 | ............. B60N 2/879 |
| EP | 3226580 A1 | | 10/2017 | |
| FR | 3092533 A1 | * | 8/2020 | ............. B60N 2/879 |
| WO | 9631872 A1 | | 10/1996 | |

OTHER PUBLICATIONS

Talian Search Report for Application No. 102022000006809; Filing Date: Apr. 6, 2022; Date of Mailing—Nov. 4, 2022, 7 pages.

* cited by examiner

*Primary Examiner* — Anthony D Barfield
(74) *Attorney, Agent, or Firm* — CANTOR COLBURN LLP

(57) ABSTRACT

Seat for a vehicle and having: a frame; a bearing structure, which is mounted on the frame, is elastically deformable, and is divided into a seat, a backrest, and a headrest; a cover, which covers the bearing structure; a microphone; and a support element, which is U-shaped, embraces the upper part of the frame, is covered by the bearing structure, and has at its top a housing accommodating, on the inside, the microphone.

11 Claims, 5 Drawing Sheets

SEAT PROVIDED WITH A MICROPHONE FOR A VEHICLE

CROSS-REFERENCE TO RELATED APPLICATIONS

This patent application claims priority from Italian patent application no. 102022000006809 filed on Apr. 6, 2022, the entire disclosure of which is incorporated herein by reference.

TECHNICAL FIELD

The present invention relates to a seat provided with a microphone for a vehicle.

BACKGROUND ART

Recently, active noise cancellation systems, which use microphones arranged in the passenger compartment to detect the ambient sounds present in the passenger compartment and therefore to be able to generate counterphase cancellation sounds that cancel the ambient sounds present in the passenger compartment, have been introduced in cars.

Preferably, the microphones used to detect the ambient sounds to be cancelled are arranged in the headrests of the seats in such a way as to detect the ambient sounds in close proximity to the ears of the car occupants (i.e. from the same identical listening point of the car occupants).

Patent application EP3226580A1 describes an active noise control system that uses a pair of microphones integrated in a seat; in particular, the two microphones are arranged on the top of the seat on the two opposite sides of the headrest.

DESCRIPTION OF THE INVENTION

The object of the present invention is to provide a seat provided with a microphone for a vehicle, the seat allowing the microphone to be arranged in an optimal position from an acoustic point of view without in any way compromising the comfort, safety and aesthetics of the seat.

According to the present invention, a seat provided with a microphone for a vehicle is provided, as claimed in the appended claims.

The claims describe preferred embodiments of the present invention forming an integral part of the present description.

BRIEF DESCRIPTION OF THE DRAWINGS

The present invention will now be described with reference to the accompanying drawings, which illustrate a non-limiting example thereof, wherein.

PREFERRED EMBODIMENTS OF THE INVENTION

Figure 1:
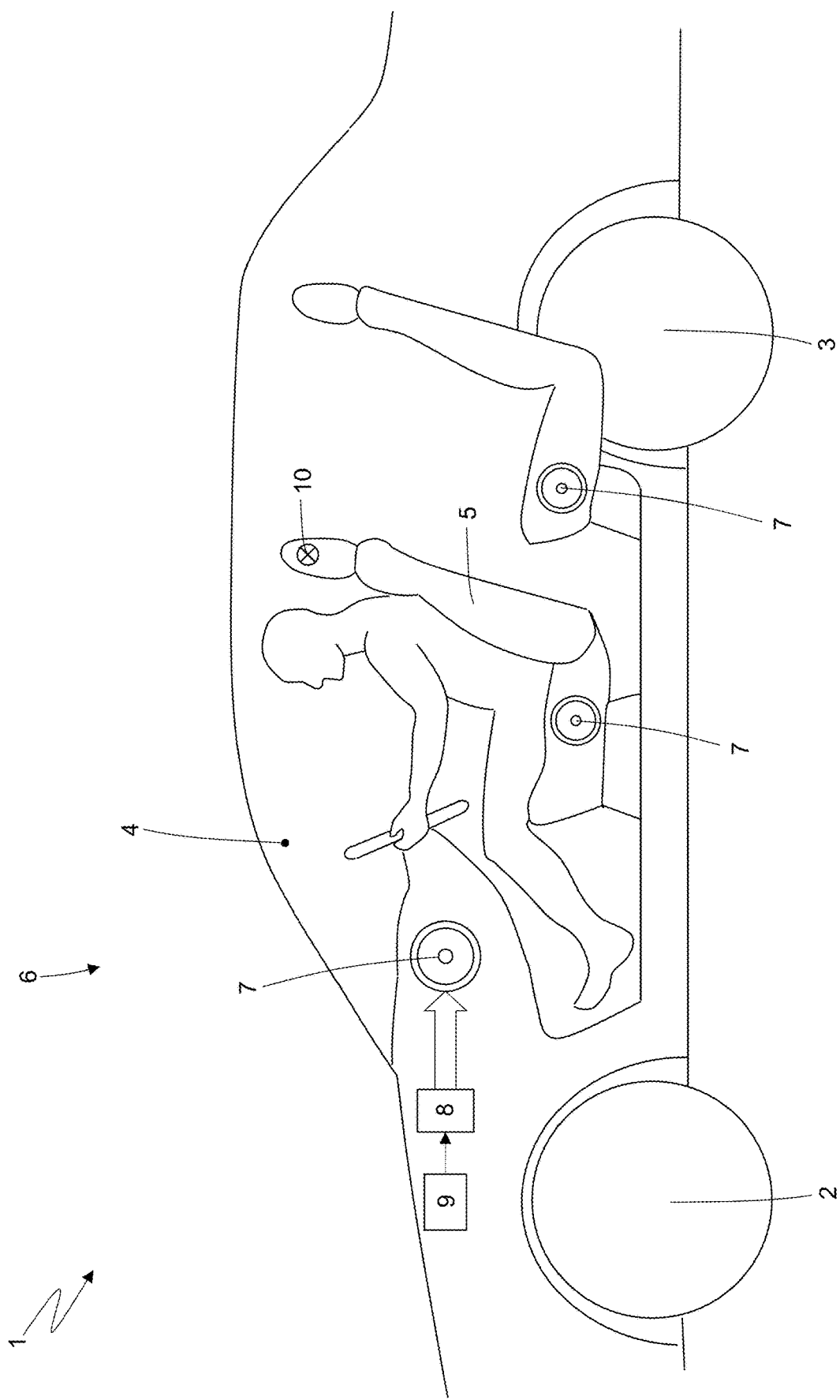
FIG. 1 is a schematic side view of a vehicle provided with (at least) one seat made according to the present invention.

In FIG. 1, reference numeral 1 indicates as a whole a vehicle provided with two front driven wheels 2 and two rear driving wheels 3, which receive the drive torque from a powertrain system comprising an internal combustion engine arranged in the front position.

The vehicle 1 comprises a passenger compartment 4 that is provided with two or more seats 5, each adapted to accommodate a corresponding occupant; that is, in passenger compartment 4 there is always room for a driver to whom passengers (whose presence is obviously optional) may be added.

The vehicle 1 comprises an audio reproduction system 6 that allows sounds to be reproduced in the passenger compartment 4; by way of example, the sounds reproduced in the passenger compartment 4 may be recorded music, a radio station, a hands-free phone call, voice information from a navigator, counterphase sound signals to achieve noise cancellation.

The audio reproduction system 6 comprises a plurality of loudspeakers 7 arranged in the passenger compartment 4 of the vehicle 1 and an amplifier 8 which controls the loudspeakers 7 by generating an electric control signal with which to drive the loudspeakers 7 (which are nothing more than electroacoustic transducers, i.e. transducers that transform an electric control signal coming from the amplifier 8 into sound waves propagating inside the passenger compartment 4).

The vehicle comprises a sound generator device 9 configured to generate an audio signal intended to cancel an ambient noise present in the passenger compartment 4; i.e. the sound generator device 9 performs the so-called "Active Road Noise Cancellation". The sound generator device 9 is connected to microphones 10 that are configured to detect an ambient sound present in the passenger compartment 4; according to a preferred embodiment illustrated in FIG. 1, each microphone 10 is arranged in a corresponding seat 5 in such a way as to detect the ambient sounds present in the passenger compartment 4 in close proximity to the ears of the occupants of the vehicle 1 (i.e. from the same identical listening point of the occupants of the vehicle 1).

Figure 2:
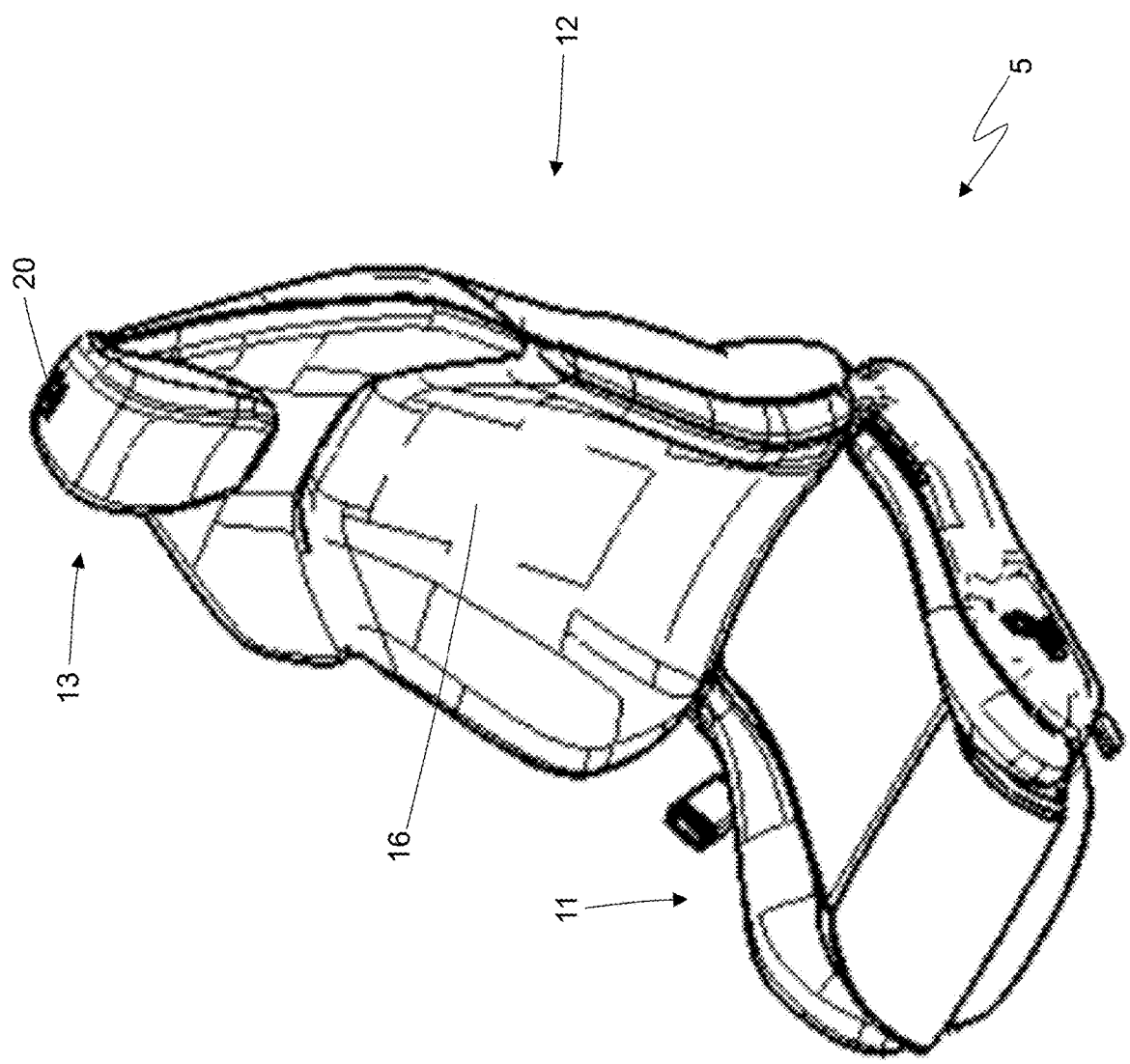
FIG. 2 is a schematic and perspective view of the seat of FIG. 1.

As illustrated in FIG. 2, each seat 5 consists of a seat (cushion) 11 having a substantially horizontal arrangement and a backrest 12 having a substantially vertical arrangement; together, the seat 11 and the backrest 12 give the seat 1 an "L" shape. The backrest 12 ends at the top with a headrest 14 which is integrated with the backrest 12 (i.e. forms a single indivisible body with the backrest 12).

Figure 3:
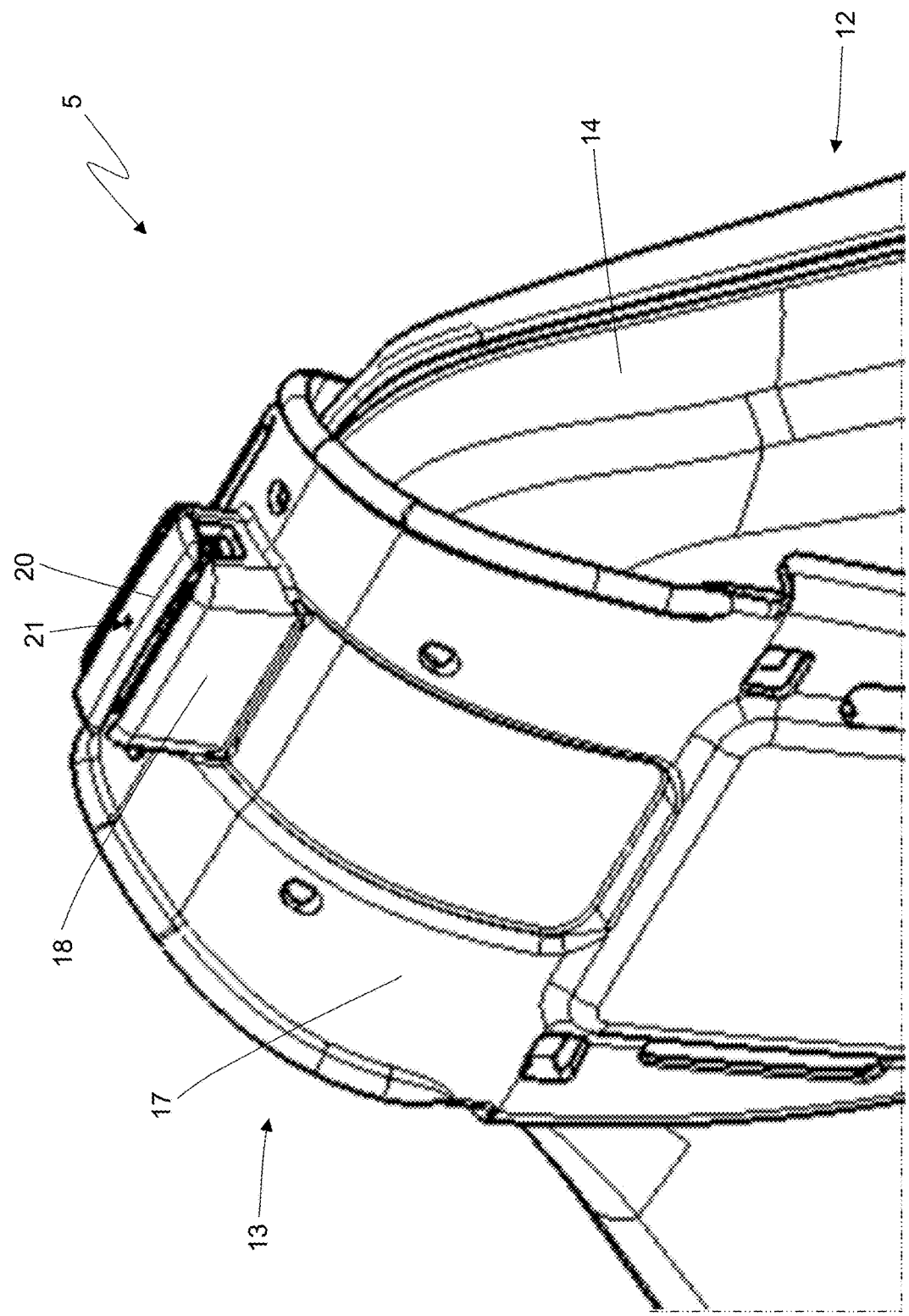
FIGS. 3 and 4 are a perspective view and an exploded perspective view with parts removed for clarity, respectively, of a headrest of the seat of FIG. 2.
Figure 4:
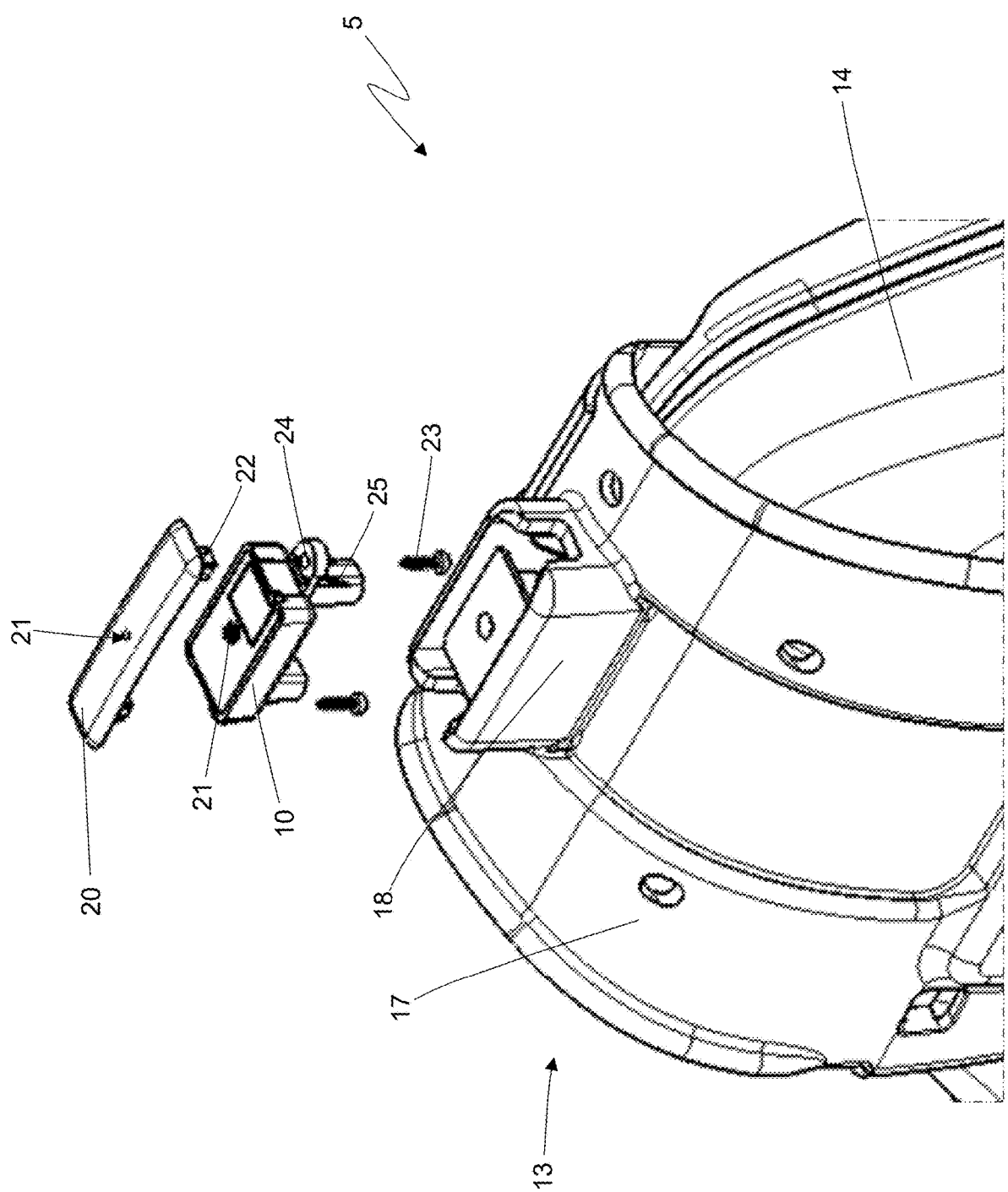

From a constructive point of view, each seat 1 comprises a frame 14 (typically made of metal or composite material and illustrated in FIGS. 3 and 4), which is fixed to the floor of the vehicle 1, a bearing structure 15 (typically made of polyurethane foam and illustrated in FIGS. 3 and 4), which is mounted on the frame 14 and is elastically yielding, and a cover 16 (visible in FIG. 2), which covers the bearing structure 15 and constitutes the aesthetic and tactile interface with the outside (the cover 16 may be of fabric or leather).

Figure 5:
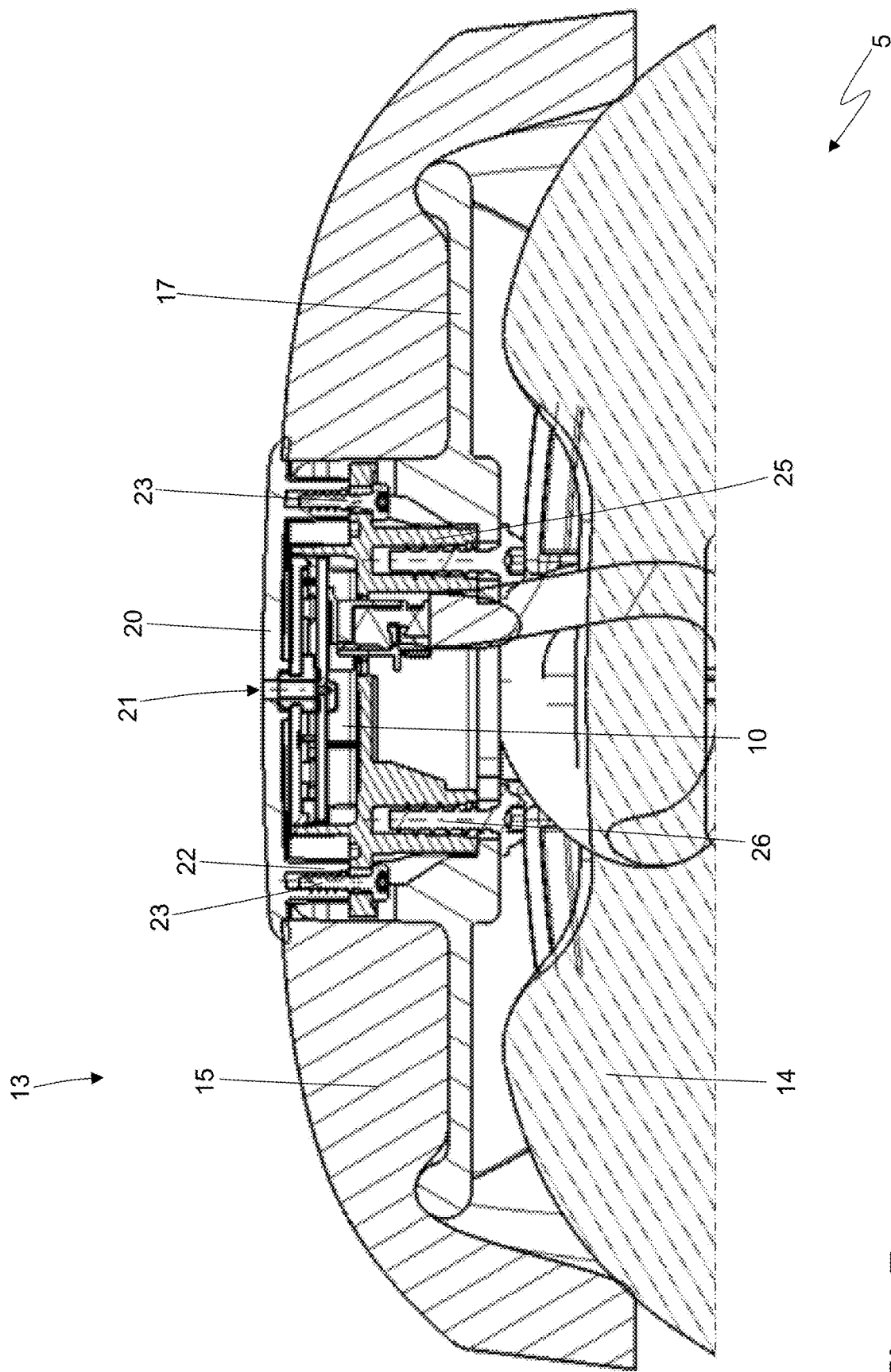
FIG. 5 is a cross-sectional view of the headrest of FIGS. 3 and 4.

As shown in FIGS. 3, 4 and 5, the seat 5 comprises a support element 17, which is "U"-shaped, embraces the upper part of the frame 14, is covered by the bearing structure 15 (in turn covered by the cover 16), and has, at its top, a housing 18 accommodating, on the inside, the microphone 10. In particular, the support element 17 embraces a front wall and a rear wall of the frame 14, or engages the front wall and the rear wall of the frame 14.

According to a preferred embodiment, the housing 18 has the shape of a parallelepiped, is cup-shaped and has an upper opening. A lid 19 is provided, which is coupled to the housing 18, closes the upper opening of the housing 18, and is arranged on the outside of the cover 16, namely on the cover 16. In other words, the lid 19 is mounted last after the cover 16 has been arranged around each seat 5.

According to a preferred embodiment, the lid 19 has at least one through hole 20 which is aligned with an audio input 21 of the microphone 10.

According to a preferred embodiment, the lid 19 has two columns 22, which project inwards and have respective threaded holes, into which two screws 23 are screwed, each of which is arranged through a corresponding eyelet 24 of the microphone 10. In this way, the screws 23 stably connect the lid 19 to the microphone 10.

According to a preferred embodiment, the microphone 10 has two columns 25, which project inwards and have respective threaded holes, into which two screws 26 are screwed, each of which is arranged through a corresponding through hole in the frame 14. In this way, the screws 26 stably connect the lid 19 to the microphone 10.

The embodiments described herein may be combined with each other without departing from the scope of protection of the present invention.

The seat 5 described above has numerous advantages.

Firstly, the seat 5 described above allows the microphone 10 to be arranged in an optimal position from an acoustic point of view without in any way compromising the comfort, safety and aesthetics of the seat 5.

Furthermore, the seat 5 described above has a particularly successful and appreciated aesthetic look precisely at the microphone 10.

The seat 5 described above allows a relatively quick and simple replacement of the microphone 10.

Finally, the seat 5 described above is simple and cost-effective to manufacture.

LIST OF REFERENCE NUMERALS OF THE FIGURES 1 vehicle
2 front wheels
3 rear wheels
4 passenger compartment
5 seat
6 reproduction system
7 loudspeakers
8 amplifier
9 sound generator device
10 microphone
11 seat
12 backrest
13 headrest
14 frame
15 bearing structure
16 cover
17 support element
18 housing
19 lid
20 through hole
21 audio input
22 columns
23 screws
24 eyelets
25 columns
26 screws

The invention claimed is:

1. A seat (5) provided with a microphone (10) for a vehicle (1), the seat comprises:
    a frame (14);
    a bearing structure (15) which is mounted on the frame (14), is elastically deformable, and is divided into a seat (11), a backrest (3) and a headrest (13);
    a cover (16), which covers the bearing structure (15);
    a microphone (10); and
    a support element (17), which is "U"-shaped, embraces the upper part of the frame (14), is covered by the bearing structure (15), and has, at its top, a housing (18) accommodating, on the inside, the microphone (10).

2. The seat (5) according to claim 1, wherein the support element (17) embraces a front wall and a rear wall of the frame (14).

3. The seat (5) according to claim 1, wherein the housing (18) has the shape of a parallelepiped.

4. The seat (5) according to claim 1, wherein the housing (18) is cup-shaped and has an upper opening.

5. The seat (5) according to claim 4 and comprising a lid (19), which is coupled to the housing (18), closes the upper opening of the housing (18), and is arranged on the outside of the cover (16), namely on the cover (16).

6. The seat (5) according to claim 5, wherein the lid (19) has at least one through hole (20).

7. The seat (5) according to claim 5, wherein the microphone (10) has an audio input (21) aligned with the through hole (20) of the lid (19).

8. The seat (5) according to claim 5, wherein the lid (19) has two first columns (22), which project inwards and have respective threaded holes, into which two first screws (23) are screwed.

9. The seat (5) according to claim 8, wherein each first screw (23) is arranged through a corresponding eyelet (24) of the microphone (10).

10. The seat (5) according to claim 1, wherein the microphone (10) has two second columns (25) which project inwards and have respective threaded holes, into which two second screws (26) are screwed.

11. The seat (5) according to claim 10, wherein each second screw (26) is arranged through a corresponding through hole in the frame (14).

* * * * *